(No Model.) 4 Sheets—Sheet 1.
W. MORAVA.
CENTER SEAL AND BY-PASS VALVE FOR GAS PURIFIERS.
No. 464,714. Patented Dec. 8, 1891.
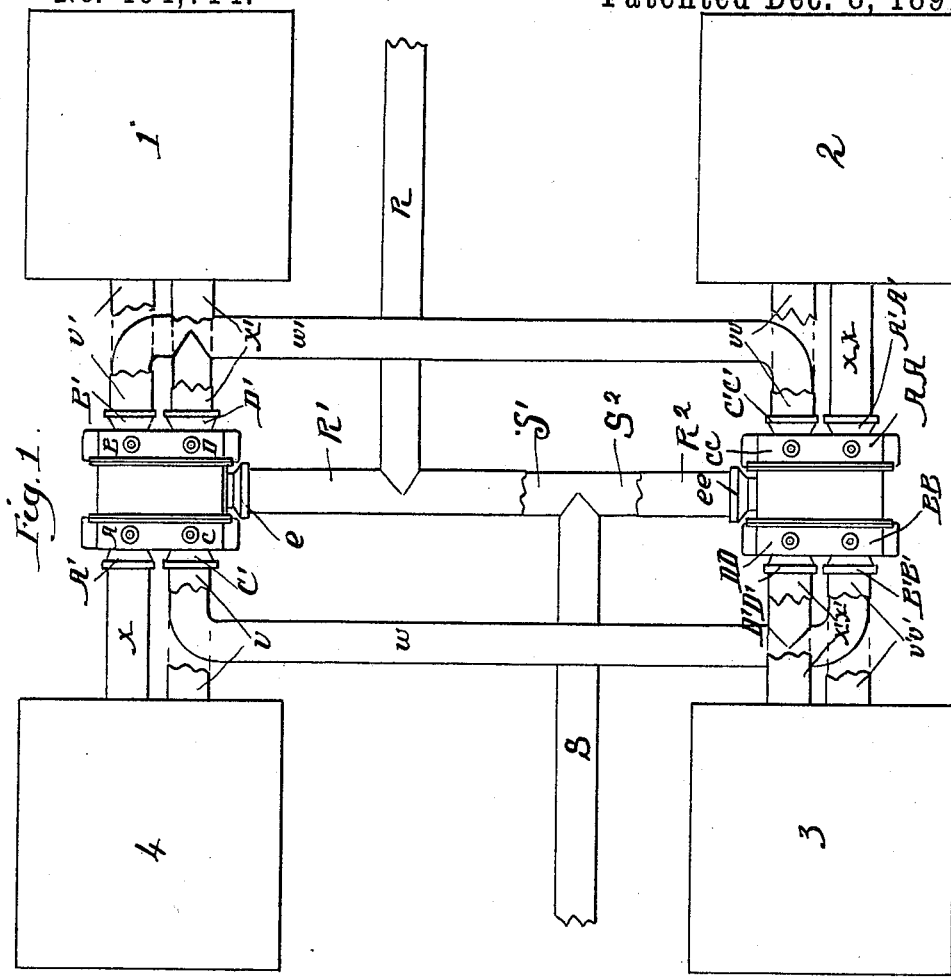
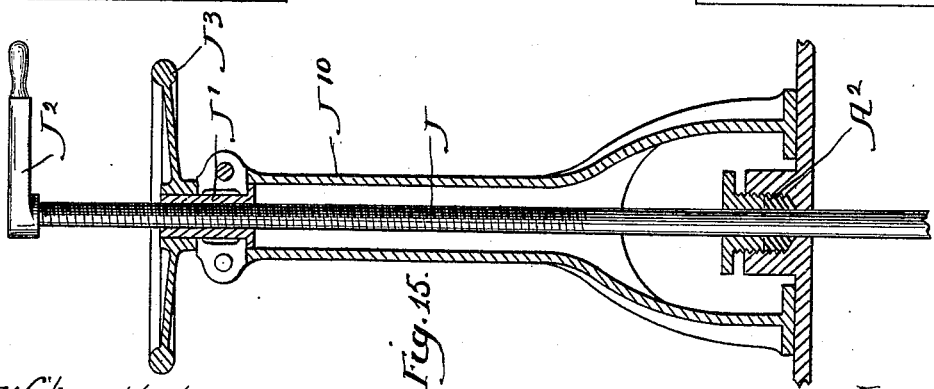
Witnesses:
Julia Usler.
Celeste P. Chapman.
Inventor:
Wensel Morava
By Burton and Burton
Attorneys (No Model.) 4 Sheets—Sheet 2.
W. MORAVA.
CENTER SEAL AND BY-PASS VALVE FOR GAS PURIFIERS.
No. 464,714. Patented Dec. 8, 1891.
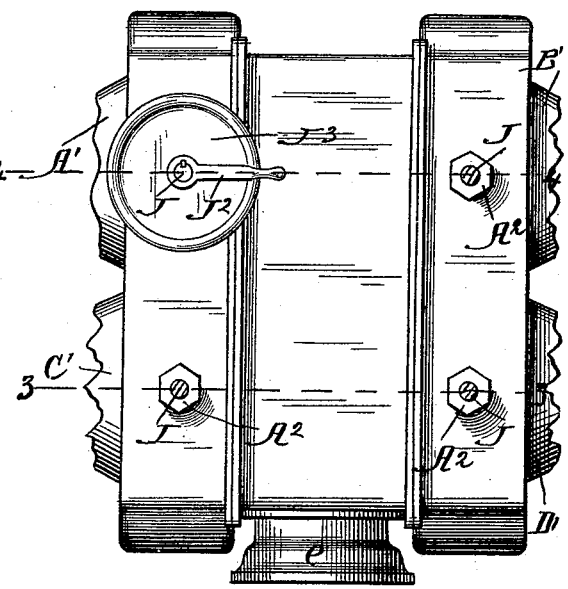
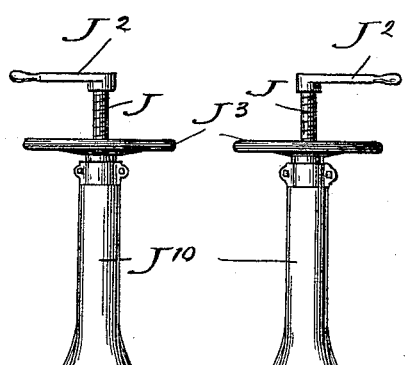
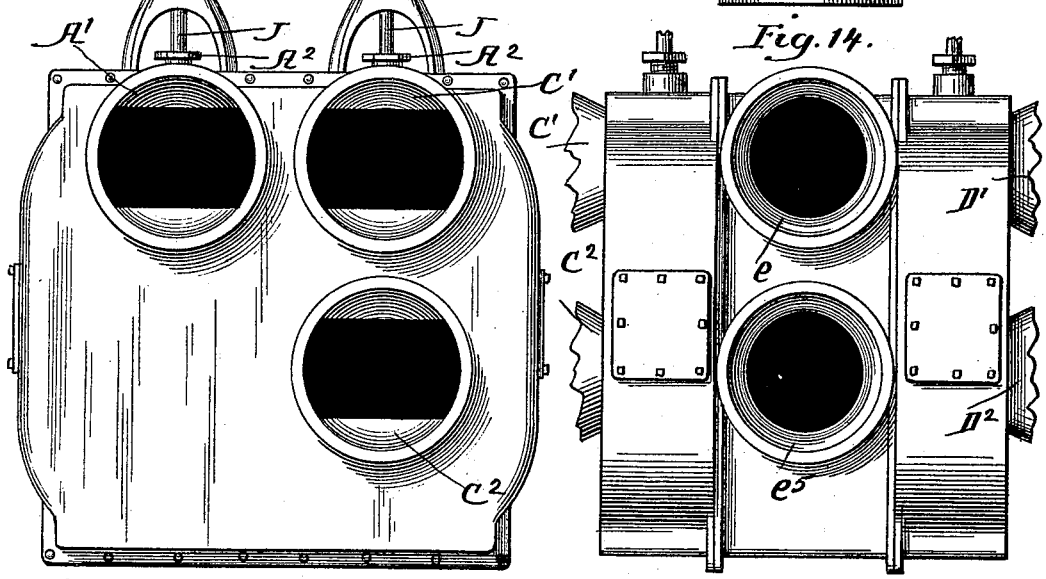

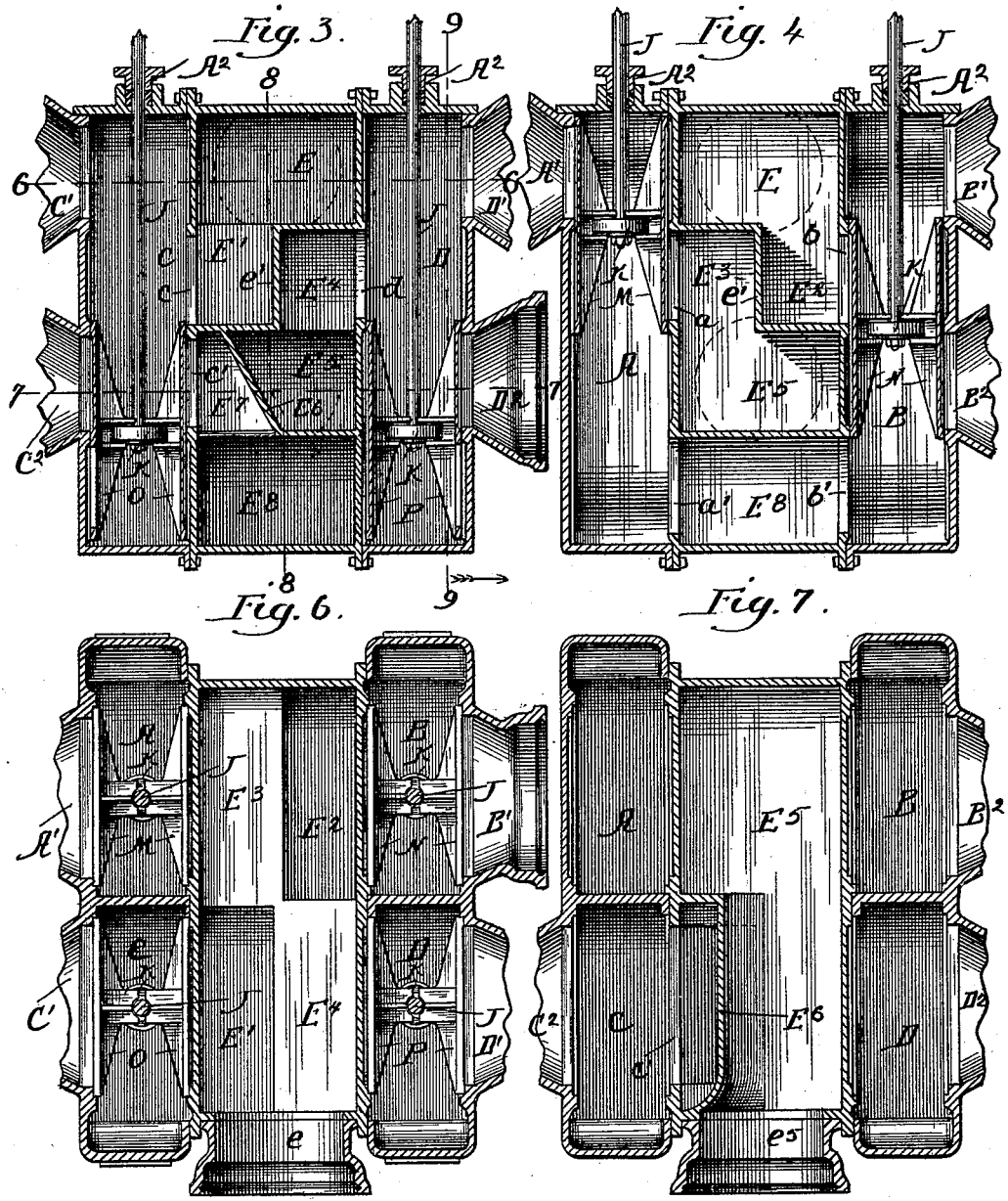

(No Model.) 4 Sheets—Sheet 4.

W. MORAVA.
CENTER SEAL AND BY-PASS VALVE FOR GAS PURIFIERS.

No. 464,714. Patented Dec. 8, 1891.

Witnesses:
Julia Osler.
Celeste Chapman.

Inventor:
Wensel Morava
By Burton & Burton
Attorneys

UNITED STATES PATENT OFFICE.

WENSEL MORAVA, OF CHICAGO, ILLINOIS.

CENTER-SEAL AND BY-PASS VALVE FOR GAS-PURIFIERS.

SPECIFICATION forming part of Letters Patent No. 464,714, dated December 8, 1891.

Application filed June 30, 1890. Serial No. 357,177. (No model.)

*To all whom it may concern:*

Be it known that I, WENSEL MORAVA, a citizen of the United States, residing at Chicago, county of Cook, and State of Illinois, have invented certain new and useful Improvements in a Center-Seal and By-Pass Valve for Gas-Purifiers, which are fully set forth in the following specification, reference being had to the accompanying drawings, forming a part thereof.

The purpose of this invention is to provide a form of valve and the chamber or case in which it operates, adapted to control the communication between several independent chambers or boxes of a gas-purifying machine, so that any one or more of said gas-purifying chambers may be used simultaneously and the gas caused to pass through them successively in any order, or so that separate currents or supplies of gas may be passed through each of said chambers separately, or so that a current of gas may be passed through any number of them in succession, while another current or other currents are independently passed through another or others of said chambers.

Figure 8:
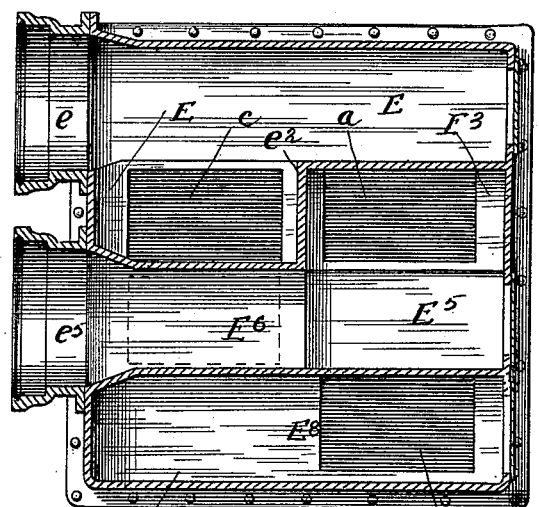
Figure 9:
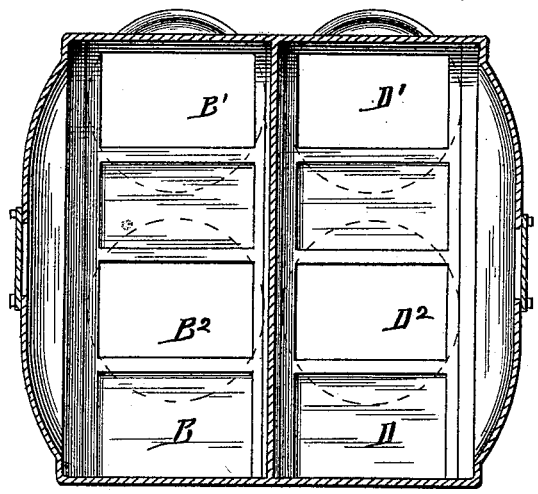
Figure 12:
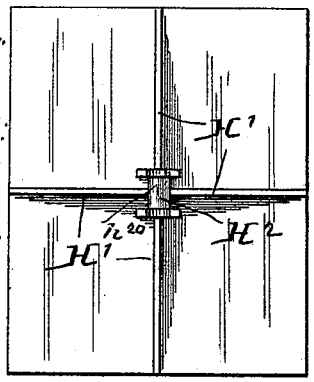
Figure 10:
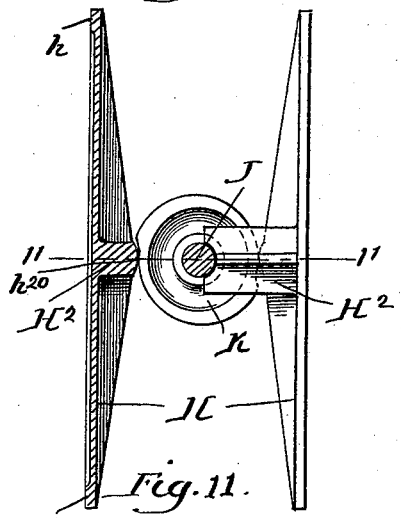
Figure 11:
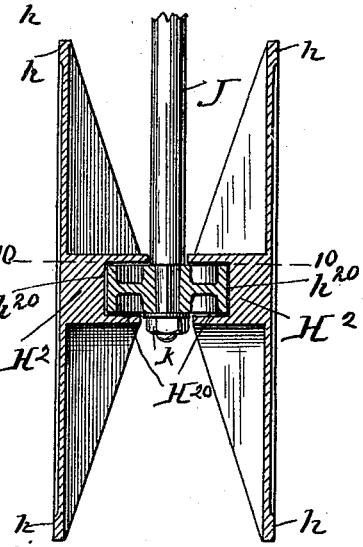
Figure 13:
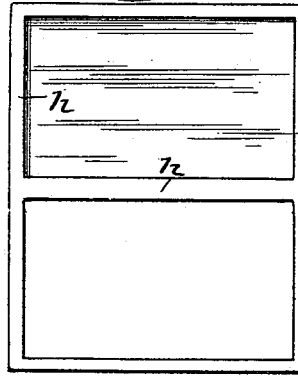

In the drawings, Figure 1 is a diagram representing four gas-purifying chambers controlled by valves embodying my invention, which are shown in plan, with the pipes by which they communicate with each other and with the purifying-chambers, respectively. Fig. 2 is a plan of one of the cases containing four of my valves which control communication between two of the purifying-chambers and which has communication with a similar case having similar valves controlling communication with the other two of the four chambers shown in Fig. 1. Fig. 3 is a section at 3 3 on Fig. 2. Fig. 4 is a section at 4 4 on Fig. 2. Fig. 5 is a side elevation of the case shown in Fig. 2, looking in the direction of the arrow adjacent to said figure. Fig. 6 is a horizontal section at the line 6 6 on Figs. 3 and 4, the valve being shown in plan, the stem only being cut by the section. Fig. 7 is a horizontal section at the line 7 7 on Figs. 3 and 4, the valves not being shown. Fig. 8 is a vertical section at the line 8 8 on Figs. 3, 4, 6, and 7, looking in the direction of the arrow on Fig. 3. Fig. 9 is a section at the line 9 9 on Figs. 3 and 6, looking in the direction of the arrow, the valves being omitted. Fig. 10 is a partly-sectional plan of one of the compound valves which reciprocate in the several chambers, section being made at the line 10 10 on Fig. 11. Fig. 11 is a vertical section of the same at the plane indicated by the line 11 11 on Fig. 10. Fig. 12 is an inner side elevation of one of the members or simple valves which compose the compound valve. Fig. 13 is a face elevation of one of said valves, which has a port through its lower portion and, except as to said lower port, represents the face of the other valves. Fig. 14 is a front elevation of one of the cases, without the port, in which the valve-stem obtains bearing. Fig. 15 is a vertical section of the turret.

It will be understood that the purifying-chambers may contain any desired form of purifying apparatus and may be operated in any manner for the purpose of purifying the gas, this invention relating only to the means of controlling the access of the gas to and its egress from such purifying-chambers.

I will first describe in detail the construction of one of the cases in which four of my valves operate, as shown in plan in Fig. 2. This case comprises four valve chambers or ways A, B, C, and D, respectively, which are parallel and located at the four corners of the case, extending vertically from top to bottom thereof and adapted to permit the reciprocation vertically in them of valves M, N, O, and P, respectively, which will be hereinafter described in detail. These chambers or valve-ways have ports by which they communicate with the purifying-chambers, as hereinafter specified. The chamber C has the port C', through which it communicates by means of means of the pipe $v$ with purifying-chamber No. 4, and the port $C^2$, on the same side as the port A', through which it communicates with the other case, located between purifying-chambes 2 and 3, the pipe $w$, leading from said port $C^2$, being connected to ports in said case which correspond to ports $B^2$ and $D^2$, hereinafter described. The valve chamber or way B has a port B' toward the upper end, through which it communicates by means of pipe $v'$ with the purifying-chamber No. 1, and a port $B^2$ below the middle, through which it communicates by the pipe $w'$ with the other case, said pipe $w'$ leading to a port in said case corresponding to the port $C^2$ above mentioned. The valve way or chamber A has a lateral port A' toward the upper end, by which it communicates through the pipe X with the purifying-chamber No. 4. The valve way or chamber D has a lateral port D' toward the upper end, by which it communicates through the pipe $x'$ with chamber No. 1, and a port $D^2$ below the middle, by which it communicates through pipe $w'$ with the other case, said pipe $w'$ thus forming a communication from both the ports $B^2$ and $D^2$ to a port in the other case corresponding to port $C^2$.

The space between the valveways A and C upon one side and B and D on the other side is partitioned into separate chambers or passages, which will now be described. The upper portion of this space, constituting about one-fourth of the vertical height, is all comprised in one chamber E, which, in addition, comprises the portions $E'$ $E^2$, being diagonally-opposite corners of a portion of space occupying about one-fourth of the height of the entire case below the quarter occupied by the main portion of the upper chamber E, said portion of space being divided by intersecting the partitions $e'$ and $e^2$, cutting it into equal quarters, the quarter of said space which is adjacent to the valveway C and the quarter adjacent to the valveway B being the portions $E'$ and $E^2$, respectively, of the chamber E. The other two portions of said second quarter of the space between the valveways A, B, C, and D, marked $E^3$ and $E^4$, and adjacent respectively to the valveways A and D, form parts of a chamber which occupies the third quarter of the space in question, except a portion $E^7$, hereinafter mentioned. The chamber $E^7$ is cut out of the corner of the third quarter of the space in question adjacent to the valveway C by the partition $E^6$. The fourth or lowest quarter of the space between the valveways is an undivided chamber $E^8$, and is continuous with the chamber or passage-way $E^7$, the horizontal partition which bounds the chamber $E^8$ at the top being broken away over the whole extent of what would be the bottom of the space $E^7$. The chamber E has at the end the opening $e$, which is connected to the supply of unpurified gas, and is termed the "main inlet." The chamber $E^5$ has an opening $e^5$, which is connected to the storage-chamber for purified gas, and is termed the "main outlet." The valve way or chamber A has the lateral port $a$, by which it communicates with the chamber $E^3$ $E^5$, and below said port on the same side it has the port $a'$, by which it communicates with chamber $E^8$. The valve way or chamber B has on the side toward the valveway A a port $b$, by which it communicates with the chamber E $E^2$, and on the same side at the lower part it has the port $b'$, by which it communicates with the chamber $E^8$. The valve way or chamber C has on the side toward the chamber D a port $c$, by which it communicates with the chamber E $E'$, and just below the port C on the same side it has the port $c'$, by which it communicates through the passage-way $E^7$ with the chamber $E^8$. The valve way or chamber D has on the side toward the valveway C the port $d$, by which it communicates with the chamber $E^4$ $E^5$.

I will now describe the valves which play in the chambers A, B, C, and D, and operate to close the ports leading from said valveways to the intermediate chambers or passage-ways and to and from the purifying chambers or boxes. As illustrated and as most easily constructed, the valveways are rectangular in cross-section, so that the walls which contain the several ports, which, it will be observed, are opposite walls, are flat, and the valves in each of said valveways are compound, comprising in fact two valves operating in two opposite directions against the opposite walls of the valve ways or chambers which have the several ports which it is the function of the valves to open and close.

I will describe first the compound valve which plays in the chamber A. The two valves H H, which make up this compound valve, are precisely similar, being rectangular plates having a slight peripheral boss $h$, which forms the seating-surface of the valve, and having on the opposite side of the back strengthening-ribs H', trending from the four sides toward the center and having at the middle point a boss $H^2$. This boss has the slot or groove $H^{20}$, the bottom of the slot serving as the bearing surface or seat $h^{20}$, against which a cam, hereinafter described, operates to force the valves toward their seats and the sides of the slot operating to guide the cam and afford means by which the cam makes the connection between the valves and their longitudinal operating-stem. J is said stem. This stem extends vertically through the valveway and out through the stuffing-box $A^2$ at the upper end of the valve-openings. K is the cam above mentioned, which is secured at the lower end of the valve-stem J, which is squared to receive it and provided with a nut $k$ to retain it, so that the cam is rotated by the stem. This cam is a wheel, each half of which, as divided by a certain diameter, is eccentric to the axis of the valve-stem, the eccentricity of the two halves being opposite, the halves being designed to operate upon the two opposite valves H, forcing them apart by the rotation of the valve-stem, the periphery of the cam operating upon the seat $h^{20}$.

I do not limit myself to a device, which might strictly be called a "cam," to perform the function of forcing the valves laterally by the rotation of the stem. There are obvious mechanical equivalents for such cam, the essential characteristic of which is that its rotation by and with the stem, whatever be its longitudinal position in the chamber, will actuate the valve laterally to seat and unseat them.

It will be observed that the valve-stem has two motions, one, the rotary motion, by which it operates the cam to force the valves apart and against the walls of the valve way or chamber, and the other a longitudinal movement by which it slides the compound valve in the chamber to the point at which it is desired to seat it. The rotary movement to seat the valves laterally is accomplished by the handle $J^2$, made fast to the upper stem. The longitudinal movement to bring the valves to seating position is effected by means of the threaded sleeve $J'$, which is journaled in the upper end of the turret $J^{10}$, which is secured on top of the case with its center in line with the valveway. The sleeve has a flange at its lower end and is inserted from below upward and has an operating-handle $J^3$, secured to it above the turret, so that it is fixed in position in the turret, but free to revolve about the vertical axis of the valve-stem. The rotation of the sleeve, it will be seen, will draw the valve-stem up or force it down through it, bringing the valves to the desired position in the chamber.

The foregoing description of the valve in the chamber A will apply to the valve in chamber B, and also to the valves in chambers C and D, with the single exception that in the chambers C and D the outer of the two valves H, making up the compound valve in said chambers, respectively, is cut away at the lower part shown in Fig. 13. The purpose of this difference in construction will be manifest as the mode of circulation through said chambers is described. It will be observed that the two valves H H, which make up the compound valve, are so connected that they do not obstruct the valve way or chamber in which the compound valve reciprocates longitudinally—that is, the gas can pass freely throughout the length of said chamber after it once has access to it uninterrupted by these valves. The two walls of the valve ways or chambers, in which are the several ports controlled by the ports H H, also afford the guide-bearings for said valves. In order to make the friction of the valves in their longitudinal movement as slight as possible, these opposite walls are recessed so as to leave standing in a plane to be contracted by the valves in their movement only the lateral marginal portions $h$, which serve as the slide-bearings for the valves, and the portions $h'$ about the margin of the ports, which serve as the seats for the valves at said ports.

I have thus far described the valves and chambers in one only of the cases containing such valves, being the case located between the chambers 1 and 4. A precisely similar case with similar chambers and valves is similarly located between chambers 2 and 3. A main supply-pipe R, leading from the source of supply of unpurified gas by means of two branches $R'$ $R^2$, conducts gas to the main inlets $e$ of the two cases. An outlet-pipe S, by means of two branches $S'$ and $S^2$, conducts the purified gas from the outlet-opening $e^6$ of the cases. The several valve chambers and parts of the case between chambers 2 and 3 are denoted by doubling the letters which denote the corresponding parts of the case between purifying-chambers 1 and 4, thus for N, put NN, for $A'$ put $A'A'$. It will be observed that there are two valves which bear direct relation to each of the two purifying-chambers, being the two valves adjacent to the chambers, respectively, one of said valves being the valve which controls the admission of gas into the purifying-chamber and the other that which controls the egress of gas from the chamber. Referring to chamber 1, for example, it will be observed that the valve N is the inlet-valve for said chamber and that the valve P is the outlet-valve for the same chamber. (It is the valve which may be termed the "outlet-valve" which has the outer member H cut away at the lower part, as above described.)

The arrangement of the four purifying-chambers with the eight controlling-valves with one inlet and one outlet for each chamber, constructed as described and in the chambered cases described, renders it possible to use the purifying-chambers—that is, to pass the gas through them—in any of the following combinations or orders of circulation, to wit: first, through purifying-chambers 1 2 3 4 in that order or in the order 2 3 4 1 or 3 4 1 2 or 4 1 2 3; second, through purifying-chambers 1 2 3 in that order or in the order 2 3 1 or 3 1 2; third, through chambers 2 3 4 in that order or in the order 3 4 2 or 4 2 3; fourth, through chambers 3 4 1 in that order or in the order 1 3 4 or 4 1 3; fifth, through chambers 4 1 2 in that order or in the order 1 2 4 or 2 4 1; sixth, through chambers 1 2 in that or the reverse order; seventh, through chambers 2 3 in that or in the reverse order; eighth, through chambers 2 4 in that order or the reverse; ninth, through chambers 3 4 in that order or the reverse; tenth, through chambers 4 1 in that order or the reverse; eleventh, through chambers 1 3 in that order or the reverse; twelfth, through chamber 1 only; thirteenth, through chamber 2 only; fourteenth, through chamber 3 only; fifteenth, through chamber 4 only. It is also possible to run two separate currents of gas through two chambers each, thus: through chambers 1 and 2 parallel with 3 and 4, through 2 and 3 parallel with 4 and 1. It is also possible to run four separate currents through one purifying-chamber each—that is to say, using purifying-chambers 1 2 3 4, all "parallel." Obviously, also, it will be possible to run one current through one chamber and another current through the other three or any two of the other three in any of the orders above mentioned for such two or three.

In order to make the various combinations which are possible practically in the use of the device, it is important that, notwithstanding the apparent complexity of the changes, the mode of making them and determining from the position of the valve-stems what the operating combinations actually are should be as simple as possible, and it is to this end that many details of the structure are adopted.

As will appear from inspection of the drawings and foregoing description, the following rules apply throughout the entire structure.

First. Each purifying-chamber has one inlet and one outlet.

Second. One valve-chamber and compound valve therein corresponds to each opening of each of the purifying-chambers—that is, for each purifying-chamber there is one valve-chamber and valve which may be termed the "inlet-valve" chamber, and one valve-chamber and valve which may be termed the "outlet-valve" chamber for said purifying-chamber. (In the subsequent description the valve and valve-chambers may be referred to as the "inlet-valves" or "inlet-valve chambers" and the "outlet-valves" or "outlet-valve chambers" of the purifying-chambers, respectively, by number.)

Third. Each inlet-valve chamber has a port which communicates with the main inlet and each outlet-valve chamber has a port which communicates with the main outlet.

Fourth. Each valve-chamber communicates, also, with the valve-chamber next to it in the series, according to its character—that is, each inlet-chamber communicates with the outlet and inlet valve chambers of the preceding purifying-chamber, and each outlet-valve chamber communicates with the inlet-valve chamber of the succeeding purifying-chambers. (The purifying-chambers may hereinafter be referred to in their relation to the valve-chambers by the term "next chamber," to indicate in the case of inlet-valve chambers the next preceding, and in the case of outlet-valve chambers the next succeeding chamber in the series.)

Fifth. The position of the several ports in the valve-chambers is such that any valve at its lowest position opens communication from the main to its own chamber—that is, if it is an inlet-valve, it opens communication from the main inlet to the purifying chamber; if it is an outlet-chamber, it opens communication to the main outlet from the purifying chamber.

A middle position of any valve opens communication through the valve-chamber from the next valve-chamber to its own purifying-chamber—that is, if it is an inlet-chamber, it opens communication from the next preceding valve-chamber to its own purifying-chamber; if it is an outlet-valve, it opens communication from its own purifying-chamber to the next succeeding valve-chamber.

The highest position of any valve cuts off communication from the mains to the chambers, respectively, to which the valves pertain—that is, in case of an inlet, cuts off the main inlet from the purifying-chamber; in case of an outlet, cuts off the purifying-chamber from the main outlet. In this position the other ports are open—that is, the ports by which each valve-chamber communicates with the preceding and with the succeeding chambers.

The last rule as to the three positions of the valves and their meaning or indication renders it a comparatively simple matter to produce any combination of which the structure is capable and to determine what combination is in force by observing the position of the valve-stems, respectively, thus: To produce the combination 1 2 3 4—that is, to pass the gas through purifying-chamber Nos. 1 2 3 4, in that order—the inlet-valve of No. 1 must be at the lowest position to admit the gas to chamber 1. The outlet-valve of No. 1 must be at middle position to open communication from No. 1 toward No. 2. The inlet-valve of No. 2 must be likewise at middle position to further open the communication to No. 2 from No. 1. The outlet-valve of No. 2 must be at middle position to open communication from No. 2 toward No. 3. The inlet-valve of No. 3 must likewise be at middle position to open communication from the direction of No. 2 into No. 3. The outlet-valve of No. 3 must be at middle position to open communication from No. 3 toward No. 4. The inlet-valve of No. 4 must be likewise at middle position to open communication from the direction of No. 3 into No. 4. The outlet-valve of No. 4 must be at lowest position to open communication from No. 4 to the main outlet.

Different combinations will illustrate another use. Thus, suppose it be desired to skip No. 2 and pass the gas from No. 1 to Nos. 3 and 4 in that order. As before, the inlet-valve of No. 1 must be at lowest position to open communication from the main inlet into No. 1. The outlet-valve of No. 1 must be at middle position to open communication from No. 1 toward the succeeding chambers. The inlet-valve of No. 2 must be at highest position to entirely close communication into that chamber. The outlet-valve of No. 2 may be at highest position to close communication from said chamber. The inlet-valve of No. 3 should be at middle position to open communication into said chamber No. 3 from the preceding chamber, which, since No. 2 is now cut off, is No. 1. The outlet-valve of No. 3 should be at middle position to open communication from No. 3 toward No. 4. The inlet-valve of No. 4 should be at middle position to open communication from the direction of No. 3 into No. 4, and the outlet-valve of No. 4 should be at lowest position to open communication to the main outlet. In like manner any other chamber in a series may be skipped, or the two intermediate ones may be skipped or any others omitted, whether first or last or intermediate, the rule as to the meaning and effect of the different positions of the valves being uniform, and therefore easily remembered and applied. For a further understanding of this the course of the gas in the two combinations above mentioned may be traced as follows: The inlet-valve N of chamber 1, being placed at the lowest position, closes the ports $B^2$ and $b'$ and leaves open the ports $B'$ and $b$, permitting the gas therefore to enter from the main inlet into the chamber E and by way of the passage $E^2$ through the port $b$ into the valve-chamber B, thence through the port $B'$ into the purifying-chamber No. 1. The outlet-valve P of chamber No. 1, being at middle position, closes the port $d$, leaving open the ports $D'$ and $D^2$, so that the gas can pass from purifying-chamber No. 1 out through port $D'$ into the valve-chamber D and thence out through the port $D^2$ toward the port $C^2 C^2$, which leads into the valve-chamber C C, wherein the inlet-valve O O of chamber No. 2 stands at middle position, leaving open said port $C^2 C^2$, so that the gas entering at that port passes through the valve-chamber C C out through the port $C' C'$ into chamber No. 2. The middle position of the valve O O, closing the ports $c c$ and $c' c'$ of the chamber C C, the outlet-valve M M of purifying-chamber No. 2 being at middle position, closes the port $a a$, leaving open the the ports $A' A'$ and $a' a'$, so that the gas passes out from chamber 2 through port $A' A'$ into valve-chamber A A, thence out through port $a' a'$ into chamber $E^8 E^8$. The inlet-valve N N of chamber 3, being at middle position, leaves open the port $B' B'$, through which the gas passes from the chamber $E^8 E^8$ into the chamber B B, when it passes through the port $B' B'$ into purifying-chamber No. 3, said middle position of the valve N N closing the ports $B^2 B^2$. The outlet-valve P P of chamber No. 3, being at middle position, closes the port $d d$, leaving open the ports $D' D'$ and $D^2 D^2$, so that the gas from chamber No. 3 passes out from the port $D' D'$ into the chamber D D and thence out through the port $D^2 D^2$ to the port $C^2$, which leads into the inlet-chamber C of purifying-chamber No. 4, wherein the valve O, standing at middle position, uncloses the port $C^2$ and closes the ports $c$ and $c'$, so that the gas passing toward the chamber C enters purifying-chamber 4 through the port $C'$. The outlet-valve M of chamber 1, being at lowest position, opens the port $A'$ and the port $a$, so that the gas passing out of the chamber No. 4 enters the chamber A through the port $A'$, passes out through chamber A through the port $a$, and thence through chamber $E^5$ to the main outlet.

The circulation in the second combination stated will be the same as that above traced, except in so far as change is made to cause purifying-chamber No. 2 to be skipped—that is, both the inlet and outlet valves of chamber No. 2 being at highest position, causing and indicating that both entrance and exit from said purifying-chamber are closed, the gas from chamber No. 1 passes through port $D'$ into the valve-chamber D, and thence by the port $D^2$ to the port $C^2 C^2$, and through that into valve-chamber C C, wherein the valve O O is at highest position, closing the ports $C' C'$ and $c c$ and opening the port $c' c'$, through which the gas passes out of chamber C C into the chamber $E^8 E^3$. The outlet-valve M M of chamber No. 2 being at highest position closes the ports $A' A'$ and $a a$, and although the port $a' a'$ is left open, since no other port in the chamber A A is open, the gas, though it might pass from chamber $E^8 E^8$ into chamber A A, can pass no farther, so that that avenue of circulation is of no effect; but the valve N N, which is the inlet-valve to chamber 3, being at middle position, opens the port $b' b'$, leading from chamber $E^8 E^8$ into the chamber B B, from which it passes through the port $B' B'$, which is also open at that position of the valve, into chamber No. 3. From this point the gas will circulate as in the first order.

Independent currents may be passed through the chambers grouped two and two or three and one or two and one, omitting the fourth entirely. For illustration: A current may be passed through chambers 4 and 1 while another current passes through chambers 2 and 3, the arrangement being then that for the first current inlet-valve of chamber 4 will be at lowest position, outlet-valve of chamber 4 will be at middle position, inlet-valve of chamber 1 will be at middle position, and outlet-valve of chamber 1 will be at lowest position. For the other current inlet-valve of chamber 2 will be at lowest position, outlet-valve of chamber 2 will be at middle position, inlet-valve of chamber 3 will be at middle position, and outlet-valve of chamber 3 at lowest position. A current may be passed through chambers 2 and 4 and an independent current passed at the same time through chamber 1 only. To accomplish this, inlet-valve chamber 2 will be at highest position, outlet-valve of chamber 2 at middle position, inlet-valve of chamber 3 at highest position, outlet-valve of chamber 3 at highest position, inlet-valve of chamber 4 will be at middle position, and outlet-valve of chamber 4 will be at lowest position. This will pass the first current through chamber 2, skipping chamber 3, thence through chamber 4, and then out. At the same time for another current inlet-valve and outlet-valve of chamber 1 will be at lowest position. These illustrations will sufficiently show the capability of the construction for the various arrangements stated, the combinations which are possible being all that are consistent with the gas passing always in the direction indicated by the order 1 2 3 4, although any number of skips may be made in that order, and the starting-point may be at any one of the chambers; or, as indicated, one, two, three, or four independent starting-points may be made for as many independent currents; but no purifying-chamber can be caused to treat two currents at the same time, and if any chamber is skipped in the course of one current it cannot be used in the course of an independent current simultaneously treated, because if the valves are set to skip it, it does not matter whether the current which is coming toward it comes from the next preceding or from the second preceding chamber, it must still skip it.

I claim—

1. In combination with the purifying-chambers having each one inlet and one outlet, the valve-chambers, one for each inlet and one for each outlet, said valve-chambers communicating on the one hand with the main gas-inlet and with the main gas-outlet, respectively, and on the other hand with their purifying-chambers, respectively, each inlet-valve chamber communicating also on the one hand with the outlet-valve chamber of the next preceding purifying-chamber and on the other hand with the inlet-valve chamber of the next succeeding purifying-chamber, the valves reciprocating in said valve-chambers, respectively, having three operative positions therein: first, uncovering the ports to the mains on the one hand and to the purifying-chambers on the other and closing all other ports; second, opening the ports to the next chambers and closing all the others; third, closing communication of their purifying-chambers, respectively, with the mains and opening all other ports, substantially as and for the purpose set forth.

2. In combination with the valve-chamber having ports in its lateral walls at different longitudinal positions, a valve-stem reciprocating longitudinally in such chamber, and a valve connected thereto and movable longitudinally therewith and adapted to be seated laterally over such ports, a bearing through which the valve-stem extends fixed with respect to the chamber, a rotatable sleeve around the stem within such bearing, and thereby adjacent to both the stem and the bearing, such sleeve being engaged by a thread with one of said adjacent parts and stopped against longitudinal movement with respect to the other, and a device constructed and arranged to be rotated by the stem and about the axis thereof, and to thereby force the valve laterally toward the ported wall of the chamber and permit it to recede therefrom, whereby a longitudinal movement of the valve-stem independent of its rotary movement is made possible and the rotary movement only seats the valve, substantially as set forth.

3. In combination with the valve-chamber, the compound valve reciprocating therein and composed of simple valves facing different lateral walls of the chamber, the stem extended longitudinally within the chamber between the simple valves of the compound valve and penetrating the chamber at the end and threaded at the part outside the chamber and connected within the chamber to the valve to operate it longitudinally, the cam which effects such connection being secured to the stem and adapted to be rotated thereby to crowd the simple valves laterally apart against their seats, respectively, the sleeve outside the chamber journaled in bearings fixed with respect thereto and having its axis coinciding with that of the chamber, said sleeve being interiorly threaded to receive the threaded stem, and provided with means for rotating it in its journal-bearings, the stem having a handle by which it may be rotated or held, whereby the valve-stem has a longitudinal and a rotary movement, the former to slide the compound valve in the chamber and the latter to rotate the cam to crowd the simple valves of said compound valve against their seats, respectively, substantially as set forth.

4. In combination with the purifying-chambers having each an inlet and an outlet, a valve-chamber for each such inlet and each such outlet, said valve-chambers communicating, respectively, with a main inlet and with a main outlet, each inlet-chamber communicating with the next inlet-chamber preceding and with the next inlet-chamber following and each outlet-chamber communicating with the next inlet-chamber following, and valves in said chambers adapted to close the ports, respectively, whereby the circulation may be directed through the purifying-chambers in succession in a certain direction from any commencing-point and omitting any chamber, substantially as set forth.

5. In combination with the purifying-chambers having one inlet and one outlet each, the inlet and outlet valve chambers pertaining to said purifying-chambers, respectively, valves which reciprocate in said valve-chambers to close and open the several ports thereof, the ports by which said valve-chambers communicate directly with their respective purifying-chambers, whether as inlets or outlets, all being in position corresponding to the same position of the valves, ports by which said valve-chambers communicate with the mains, respectively, being also all in position corresponding to the same position of the valves, said position being the same as that which corresponds to the ports which lead directly to the purifying-chambers, ports leading from said valve-chambers to preceding and following valve-chambers in the order of circulation, said ports being all in positions which adapt them to be left open by the valves, respectively, at the same position, said position being a different one from that at which said valves leave open the ports leading directly to the purifying-chambers, respectively, substantially as set forth.

6. In combination with the purifying-chambers, the inlet and outlet valve chambers pertaining to such purifying-chambers, respectively, assembled in two cases, which comprise each the valve-chambers for two consecutive purifying-chambers, such cases having each four valve-chambers so assembled and comprising an intervening space partitioned into passages, one of which communicates with the main inlet and with the inlet-chambers, another of which communicates with the main outlet and with the outlet-chambers, and a third of which communicates with both the inlet-chambers and with one of the outlet-chambers, the remaining outlet-chamber having communication with the next similar case, substantially as set forth.

In testimony whereof I have hereunto set my hand, at St. Louis, Missouri, in the presence of two witnesses, this 10th day of June, 1890.

W. MORAVA.

Witnesses:
C. S. SMITH,
J. DINEHART.